United States Patent
Ma et al.

(10) Patent No.: US 11,450,842 B2
(45) Date of Patent: Sep. 20, 2022

(54) SECONDARY BATTERY, METHOD FOR MANUFACTURING THE SAME, AND APPARATUS CONTAINING THE SAME

(71) Applicant: Contemporary Amperex Technology Co., Limited, Ningde (CN)

(72) Inventors: Jianjun Ma, Ningde (CN); Rui Shen, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/541,297

(22) Filed: Dec. 3, 2021

(65) Prior Publication Data

US 2022/0093906 A1 Mar. 24, 2022

Related U.S. Application Data

(63) Continuation of application No. PCT/CN2020/088255, filed on Apr. 30, 2020.

(51) Int. Cl.
*H01M 4/133* (2010.01)
*H01M 4/1393* (2010.01)
(Continued)

(52) U.S. Cl.
CPC ......... *H01M 4/133* (2013.01); *H01M 4/1393* (2013.01); *H01M 4/505* (2013.01);
(Continued)

(58) Field of Classification Search
None
See application file for complete search history.

(56) References Cited

U.S. PATENT DOCUMENTS

| 9,972,844 | B2 | 5/2018 | Takahata et al. |
| 2014/0186702 | A1* | 7/2014 | Takahata ............... H01M 4/133 429/211 |

(Continued)

FOREIGN PATENT DOCUMENTS

| CN | 108140810 A | 6/2018 |
| CN | 108701816 A | 10/2018 |

(Continued)

OTHER PUBLICATIONS

The extended European search report for European Application No. 20918126.2, dated Mar. 11, 2022, 9 pages.

(Continued)

*Primary Examiner* — Yoshitoshi Takeuchi
(74) *Attorney, Agent, or Firm* — East IP P.C.

(57) ABSTRACT

The present application relates to a secondary battery, a method for manufacturing the same and an apparatus containing the same. Specifically, in the secondary battery the first negative electrode film comprises a first negative electrode active material, the second negative electrode film comprises a second negative electrode active material. The first negative electrode active material comprises natural graphite and satisfies: 6 mΩ·cm≤A≤12 mΩ·cm, the second negative electrode active material comprises artificial graphite and satisfies: 13 mΩ·cm≤B≤20 mΩ·cm, A is a powder resistivity of the first negative electrode active material tested at a pressure of 8 Mpa, and B is a powder resistivity of the second negative electrode active material tested at a pressure of 8 Mpa. The secondary battery of the present application can have better kinetic performance and longer cycle life while maintaining higher energy density.

19 Claims, 3 Drawing Sheets

(51) Int. Cl.
  *H01M 4/505* (2010.01)
  *H01M 4/525* (2010.01)
  *H01M 4/62* (2006.01)
  *H01M 10/0525* (2010.01)
  *H01M 10/0585* (2010.01)
  *H01M 4/02* (2006.01)

(52) U.S. Cl.
  CPC ........... *H01M 4/525* (2013.01); *H01M 4/621* (2013.01); *H01M 10/0525* (2013.01); *H01M 10/0585* (2013.01); *H01M 2004/021* (2013.01); *H01M 2004/027* (2013.01)

(56) References Cited

U.S. PATENT DOCUMENTS

| | | | |
|---|---|---|---|
| 2018/0062158 A1* | 3/2018 | Kim | H01M 4/364 |
| 2018/0219217 A1* | 8/2018 | Park | H01M 4/133 |
| 2018/0287145 A1 | 10/2018 | Lee et al. | |
| 2019/0288279 A1* | 9/2019 | Xu | H01M 4/1393 |
| 2020/0119336 A1* | 4/2020 | Shinomiya | H01M 4/364 |

FOREIGN PATENT DOCUMENTS

| | | | | |
|---|---|---|---|---|
| EP | 3396745 A2 * | 10/2018 | | H01M 10/0525 |
| EP | 3396745 A2 | 10/2018 | | |
| JP | H11111270 A | 4/1999 | | |
| KR | 20190060719 A | 6/2019 | | |
| WO | WO-2018103332 A1 * | 6/2018 | | C01B 32/21 |

OTHER PUBLICATIONS

PCT International Search Report for PCT/CN2020/088255, dated Jan. 20, 2021, 14 pages.

* cited by examiner

SECONDARY BATTERY, METHOD FOR MANUFACTURING THE SAME, AND APPARATUS CONTAINING THE SAME

CROSS-REFERENCES TO RELATED APPLICATIONS

This application is a continuation of International application No. PCT/CN2020/088255, filed on Apr. 30, 2020, which is hereby incorporated by reference in its entirety.

TECHNICAL FIELD

The present application belongs to the field of electrochemical technology, and more specifically, relates to a secondary battery and an apparatus containing the same.

BACKGROUND

The secondary battery is widely used in various consumer electronic products and electric vehicles due to its prominent features such as light weight, no pollution and no memory effect.

With the continuous development of new energy industry, people put forward higher requirements for the use of secondary batteries. It is still a key challenge in the field of secondary battery how to make the secondary battery have other good electrochemical performances while maintaining higher energy density.

In view of the above, it is necessary to provide a secondary battery with several different performances all being good so as to meet different needs from users.

SUMMARY

In view of the technical problems in the background technology, the present application provides a secondary battery and an apparatus containing the same, aiming at making the secondary battery have better kinetic performance and longer cycle life while maintain higher energy density.

In order to achieve the above object, in a first aspect of the present application, there is provided a secondary battery, the secondary battery comprises a negative electrode plate, the negative electrode plate comprises a negative electrode current collector and a negative electrode film, the negative electrode film comprises a first negative electrode film and a second negative electrode film; the first negative electrode film is disposed on at least one surface of the negative electrode current collector and comprises a first negative electrode active material, the second negative electrode film is disposed on the first negative electrode film and comprises a second negative electrode active material. The first negative electrode active material comprises natural graphite and satisfies: 6 mΩ·cm≤A≤12 mΩ·cm, the second negative electrode active material comprises artificial graphite and satisfies: 13 mΩ·cm≤B≤20 mΩ·cm, A is a powder resistivity of the first negative electrode active material tested at a pressure of 8 Mpa, and B is a powder resistivity of the second negative electrode active material tested at a pressure of 8 Mpa.

In a second aspect of the present application, there is provided a method for manufacturing a secondary battery, comprising the following steps to prepare the negative electrode plate of the secondary battery:

1) forming, on at least one surface of the negative electrode current collector, a first negative electrode film that comprises a first negative electrode active material, the first negative electrode active material comprises natural graphite and satisfies: 6 mΩ·cm≤A≤12 mΩ·cm;

2) forming, on the first negative electrode film, a second negative electrode film that comprises a second negative electrode active material, the second negative electrode active material comprises artificial graphite and satisfies: 13 mΩ·cm≤B≤20 mΩ·cm;

A is a powder resistivity of the first negative electrode active material tested at a pressure of 8 Mpa, and B is a powder resistivity of the second negative electrode active material tested at a pressure of 8 Mpa.

In a third aspect of the present application, there is provided an apparatus, which comprises the secondary battery according to the first aspect of the present application or the secondary battery that is manufactured by the method according to the second aspect of the present application.

Compared with existing technologies, the present application includes at least the following beneficial effects:

For the secondary battery of the present application, the negative electrode plate comprises the first negative electrode film and the second negative electrode film, and specific negative electrode active material is selected in each negative electrode film, through the reasonable design of the upper film and the lower film, the secondary battery of the present application can have good kinetic performance and longer cycle life while maintaining higher energy density. The apparatus of the present application comprises the secondary battery and thus has at least the same advantages as the secondary battery.

In the drawings, the designation of the reference signs is as follows:

1 Battery pack
2 Upper case body
3 Lower case body
4 Battery module
5 Secondary battery
51 Case
52 Electrode assembly
53 Cover plate
10 Negative electrode plate 101 Negative electrode current collector
102 Second negative electrode film
103 First negative electrode film

DETAILED DESCRIPTION

The present application is further described with reference to the embodiments. It should be understood that these embodiments are only for illustrating the present application, and are not intended to limit the scope of the present application.

For the sake of brevity, only certain numerical ranges are explicitly disclosed herein. However, any lower limit may be combined with any upper limit to form a range that is not explicitly described; and any lower limit may be combined with any other lower limit to form a range that is not explicitly described, and any upper limit may be combined with any other upper limit to form a range that is not explicitly described. Further, each individually disclosed point or single value may be a lower or upper limit and combined with any other point or single value or combined with other lower or upper limits to form a range that is not explicitly described.

In the description herein, it should be noted that, unless otherwise stated, the recitation of numerical ranges by "no less than" and "no more than" include all numbers within that range including the endpoints, the recitation of "more" in the phrase "one or more" includes two or more.

Unless otherwise stated, the terms used in the present application have the meaning well-known by a person of ordinary skill in the art. Unless otherwise stated, the values of the parameters disclosed in the present application may be measured by various methods commonly used in the art (for example, may be measured according to the method illustrated in the embodiments of the present application).

Secondary battery

In a first aspect of the present application, there is provided a secondary battery. The secondary battery comprises a positive electrode plate, a negative electrode plate and an electrolyte. During charging and discharging process of the battery, active ions are intercalated into and deintercalated from the positive electrode plate and the negative electrode plate therebetween back and forth. The electrolyte conducts active ions between the positive electrode plate and the negative electrode plate.

[Negative Electrode Plate]

In the secondary battery of the present application, the negative electrode plate comprises a negative electrode current collector and a negative electrode film, the negative electrode film comprises a first negative electrode film and a second negative electrode film. The first negative electrode film is disposed on at least one surface of the negative electrode current collector and comprises a first negative electrode active material, the second negative electrode film is disposed on the first negative electrode film and comprises a second negative electrode active material. The first negative electrode active material comprises natural graphite and satisfies: 6 mΩ·cm≤A≤12 mΩ·cm, the second negative electrode active material comprises artificial graphite and satisfies: 13 mΩ·cm≤B≤20 mΩ·cm, A is a powder resistivity of the first negative electrode active material tested at a pressure of 8 Mpa and B is a powder resistivity of the second negative electrode active material tested at a pressure of 8 Mpa.

The inventors have found that when the first negative electrode active material comprises natural graphite, the second negative electrode active material comprises artificial graphite, and the powder resistivity of the first negative electrode active material and the powder resistivity of the second negative electrode active material respectively fall within a certain range, the active sites in the upper film of the negative electrode film and the active sites in the lower film of the negative electrode film can be reasonably matched, and thereby improving the kinetic performance of the battery; meanwhile, a gradient pore distribution can be formed due to the specific design of the materials respectively in the upper film and the lower film, which effectively improves the electrolyte infiltration performance and the liquid-phase conduction capability of the active ions, thereby improving the cycle life of the battery.

In some preferred embodiments, the first negative electrode active material satisfies: 8 mΩ·cm≤A≤11 mΩ·cm.

In some preferred embodiments, the second negative electrode active material satisfies: 14 mΩ·cm≤B≤18 mΩ·cm.

Through further study, the inventors have found that, the performances of the battery can be further improved when the negative electrode film of the present application satisfies one or more of the following parameters and based on the aforementioned design.

In some preferred embodiments, 1.4≤B/A≤3; and more preferably, 1.5≤B/A≤2.0. When the value of B/A is controlled to fall within the given range, the gradient resistance of the negative electrode active material in the upper film and the gradient resistance of the negative electrode active material in the lower film can be better matched. Therefore, the active ions deintercalated from the positive electrode can more quickly and orderly intercalate into the particles that are positioned at the bottom part of the negative electrode active martials, which can reduce the risk of lithium precipitation during the cycle process of the battery and reduce the polarization so as to further improve the cycle performance and the safety performance of the battery.

In some preferred embodiments, the first negative electrode active material has a particle size distribution (Dv90-Dv10)/Dv50 of less than the second negative electrode active material.

In some preferred embodiments, the first negative electrode active material may have a particle size distribution of 1.0≤(Dv90-Dv10)/Dv50≤1.5, and more preferably, 1.0≤(Dv90-Dv10)/Dv50≤1.3.

In some preferred embodiments, the second negative electrode active material may have a particle size distribution of 1.0≤(Dv90-Dv10)/Dv50≤2, and more preferably, 1.2≤(Dv90-Dv10)/Dv50≤1.7.

When the first negative electrode active material has a particle size distribution of less than the second negative electrode active material, the fine powder content of the negative electrode active material in the upper film and the fine powder content of the negative electrode active material in the lower film are better matched. On the one hand, the diffusion rates of the active ions in different particles are effectively adjusted, the stresses produced during the deintercalation and intercalation process of the active ions are reasonably matched, and the expansion of the electrode plate during the cycle process of the battery is decreased, thereby further improving the cycle performance of the battery; on the other hand, the diffusion path of the active ions are effectively adjusted, which is favor of the fast diffusion of the active ions in the electrode plate so as to further improve the kinetic performance of the battery; in addition, the particle size distribution of the negative electrode active material in the upper film and the particle size distribution of the negative electrode active material in the lower film both fall within the given ranges, which is beneficial to increasing the pressed density of the negative electrode film is increased so as to further improve the energy density of the battery.

In some preferred embodiments, the first negative electrode active material may have a volume average particle size Dv50 of from 15 μm to 19 μm, and more preferably from 16 μm to 18 μm.

In some preferred embodiments, the second negative electrode active material may have a volume average particle size Dv50 of from 14 μm to 18 μm, and more preferably from 15 μm to 17 μm.

When the volume average particle size Dv50 of the first negative electrode active material and/or the volume average particle size Dv50 of the second negative electrode active material fall within the given ranges, it is helpful to control the powder resistivity of the negative electrode active material in the upper film and the powder resistivity of the negative electrode active material in the lower film to fall within the given ranges of the present application, thereby further improving the kinetic performance of the battery.

In some preferred embodiments, the first negative electrode active material has a volume average particle size Dv50 of greater than the second negative electrode active material.

When the first negative electrode active material has a volume average particle size Dv50 of greater than the second negative electrode active material, the difference between the capacity of the active material in the upper film and the capacity of the active material in the lower film can be decreased, the risk of lithium precipitation during the cycle process of the battery can be decreased, and therefore, the cycle performance of the battery can be further improved.

In some preferred embodiments, the first negative electrode active material may have a powder compaction density of from 1.85 g/cm$^3$ to 2.1 g/cm$^3$ under an action force of 50,000 N, and more preferably from 1.9 g/cm$^3$ to 2.0 g/cm$^3$.

In some preferred embodiments, the second negative electrode active material may have a powder compaction density of from 1.7 g/cm$^3$ to 1.9 g/cm$^3$ under an action force of 50,000 N, and more preferably from 1.8 g/cm$^3$ to 1.9 g/cm$^3$.

The inventors have found that when the powder compaction density of the negative electrode active material in the upper film and the powder compaction density of the negative electrode active material in the lower film under an action force of 50,000 N fall within the given ranges, it is helpful to control the powder resistivity of the negative electrode active material in the upper film and the powder resistivity of the negative electrode active material in the lower film to fall within the given ranges of the present application. Meanwhile, the powder compaction densities of the graphite respectively in the upper film and the lower film are reasonably matched, which is beneficial to forming gradient pores in the e electrode plate and reducing the liquid-phase conduction resistance of the active ions, thereby further improving the kinetic performance of the battery.

In some preferred embodiments, the first negative electrode active material may have a graphitization degree of from 95% to 98%, and more preferably from 96% to 97%.

In some preferred embodiments, the second negative electrode active material may have a graphitization degree of from 90% to 95%, and more preferably from 91% to 93%.

The inventors have found that when the graphitization degree of the negative electrode active material in the upper film and the graphitization degree of the negative electrode active material in the lower film fall within the given ranges, it is helpful to control the powder resistivity of the negative electrode active material in the upper film and the powder resistivity of the negative electrode active material in the lower film to fall within the given ranges of the present application. Meanwhile, the crystal structures of the graphite respectively in the upper film and the lower film are reasonably matched, which effectively improves the solid-phase diffusion rate of the active ions during the charging and discharging cycle process and reduces the side reactions occurred during the charging and discharging cycle process of the battery, thereby further improving the kinetic performance and the cycle performance of the battery.

In some preferred embodiments, the first negative electrode active material may be in a shape of one or more of sphere and spheroid. At this time, the anisotropy of the first negative electrode active material can be effectively improved so as to further suppress the electrochemical expansion of the battery and improve the processing performance of the electrode plate.

In some preferred embodiments, the second negative electrode active material may be in a shape of one or more of block and flake. At this time, the gaps among the second negative electrode active material particles can be effectively improved, bridging effect is easily produced among the particles that are in a shape of block and flake, which is in favor of the electrolyte infiltration and the transmission of the lithium ions so as to further improve the kinetic performance of the battery.

In some preferred embodiments, an amorphous carbon coating layer is presented on at least part of surface of the first negative electrode active material.

In some preferred embodiments, no amorphous carbon coating layer is presented on surface of the second negative electrode active material.

In some preferred embodiments, the natural graphite constitutes ≥50% by mass of the first negative electrode active material, and more preferably from 80% to 100% by mass.

In some preferred embodiments, the artificial graphite constitutes ≥80% by mass of the second negative electrode active material, and more preferably from 90% to 100% by mass.

In the present application, the powder resistivity of the negative electrode active material has a well-known meaning in the art and can be measured using a method known in the art. For example, a four-probe method is used, specifically may refer to GB/T 30835-2014, which uses a powder resistance tester (ST2722-SZ) to carry out the measurement: put a certain amount of sample powder to be tested in a special mold, set different pressures, and the powder resistivity under a certain pressure can be obtained. In the present application, the pressure may be 8 Mpa.

In the present application, Dv10, Dv50 and Dv90 of the materials all have a well-known meaning in the art and can be measured using a method known in the art. For example, they may be obtained by using a laser diffraction particle size distribution analyzer (for example, Mastersizer 3000) according to a particle size analysis-laser diffraction method (specifically may refer to GB/T 19077-2016). Dv10 is the particle size when the cumulative volume distribution percentage of the material reaches 10%; Dv50 is the particle size when the cumulative volume distribution percentage of the material reaches 50%, which is also known as the volume median particle size; Dv90 is the particle size when the cumulative volume distribution percentage of the material reaches 90%.

In the present application, the powder compaction density of the material has a well-known meaning in the art and can be measured using a method known in the art. For example, referring to GB/T 24533-2009, an electronic compression-testing machine (for example, UTM7305) is used to carry out the measurement: put a certain amount of powder on a special compaction mold, set different pressures, read the values of the thickness of the powder under different pressures from the instrument, and calculate the compaction density thereof under a certain pressure. In the present application, the pressure may be 50,000 N.

In the present application, the graphitization degree of the material has a well-known meaning in the art and can be measured using a method known in the art. For example, the graphitization degree can be measured by using an X-ray diffractometer (for example, Bruker D8 Discover), referring to JIS K 0131-1996 and JB/T 4220-2011, the value of $d_{002}$ is obtained, and then the graphitization degree can be calculated by the formula: the graphitization degree $G=(0.344-d_{002})/(0.344-0.3354)\times 100\%$, wherein $d_{002}$ refers to an interlayer spacing of the crystal structure of the material in nanometer (nm).

In the present application, the morphology of the material has a well-known meaning in the art and can be determined using a method known in the art. For example, the morphology of the material particle is determined by sticking the material onto a conductive adhesive and using a scanning electron microscope (for example, ZEISS Sigma 300). Specific measurement may refer to JY/T 010-1996.

It should be noted that, the testing of the above parameters of the negative electrode active material can be carried out by using a sample which is taken before the coating process, or using a sample which is taken from the cold-pressed negative electrode film.

When the sample is taken from the cold-pressed negative electrode film, as an example, the measurement can be carried out as follows:

(1) firstly, randomly select a cold-pressed negative electrode film to take the sample of the second negative electrode active material (for example, the sample may be taken by scraping via a blade), and the scraping depth is no deep than the boundary zone between the first negative electrode film and the second negative electrode film;

(2) secondly, take the sample of the first negative electrode active material, since there may be an inter-melting layer at the boundary zone between the first negative electrode film and the second negative electrode film during the cold-pressing process of the negative electrode film (that is, there are both the first negative electrode active material and the second negative electrode active material existing in the inter-melting layer), in order to ensure the accuracy of the measurement, when the sample of the first negative electrode active material is taken, the inter-melting layer may be scraped off first, and then the sample of the first negative electrode active material can be taken by scraping;

(3) respectively put the collected first negative electrode active material and the collected second negative electrode active material into deionized water, which is followed by filtering and drying, and then the dried first and second negative electrode active material are respectively sintered at a certain temperature and for a certain time (for example, 400° C., 2 hours) so as to remove the binder and the conductive carbon, finally the sample of the first negative electrode active material and the sample of the second negative electrode active material are obtained.

During the sampling process, the position of the boundary zone between the first negative electrode film and the second negative electrode film can be determined with the help of an optical microscope or a scanning electron microscope.

Both the natural graphite and the artificial graphite used in the present application can be obtained commercially.

In the preferred embodiments of the present application, the negative electrode film has a thickness of ≥50 μm, and preferably from 60 μm to 75 μm. It should be noted that, the thickness of the negative electrode film refers to the total thickness of the negative electrode film (that is, the sum of the thickness of the first negative electrode film and the thickness of the second negative electrode film).

In the preferred embodiments of the present application, the negative electrode film has an areal density of from 9 mg/cm$^2$ to 14 mg/cm$^2$, and more preferably from 11 mg/cm$^2$ to 13 mg/cm$^2$. It should be noted that the areal density of the negative electrode film refers to the total areal density of the negative electrode film (that is, the sum of the areal density of the first negative electrode film and the areal density of the second negative electrode film).

In the preferred embodiments of the present application, a thickness ratio of the first negative electrode film to the second negative electrode film is from 1:1.01 to 1:1.1, and more preferably from 1:1.02 to 1:1.06.

The thickness ratio of the upper film to the lower film falls within the given range, it is beneficial to forming gradient pore distribution between the upper film and the lower film, the liquid-phase conduction resistance of the active ions deintercalated from the positive electrode on the surface of the negative electrode film is reduced, which will not lead to lithium precipitation on the surface of negative electrode film caused by the accumulation of the active ions; meanwhile, the uniform diffusion of the active ions in the film is beneficial to reducing the polarization, thereby further improving the kinetic performance and the cycle performance of the battery.

In the preferred embodiments of the present application, under the conditions that two circular areas with the same area are arbitrarily selected on the negative electrode plate and respectively marked as a first area and a second area as well as a distance between centers of the first area and the second area is 20 cm, a difference between plate resistance R11 of the first area and plate resistance R12 of the second area satisfies: |R11-R12|≤3 mΩ·cm; and more preferably |R11-R12|≤1 mΩ·cm.

The resistance difference between any arbitrary two circular areas on the negative electrode plate with a same area and a distance between centers thereof of 20 cm is smaller, which indicates that the resistance fluctuation of the negative electrode plate is smaller, that is to say, the first negative electrode active material and the second negative electrode active material are well dispersed in the negative electrode film. The pressed density, the cycle stability and the electrolyte distribution uniformity at different positions of the negative electrode plate can all be improved, the transmission performance of the active ions and the conduction performance of the electrons at different positions of the negative electrode plate can be basically at the same level, and therefore, the capacity elaboration, the cycle life, the storage life and the kinetic performance at different positions of the negative electrode plate can all be improved. The overall consistency of the negative electrode plate is good, which can further improve the energy density, the high-temperature performance and the low-temperature power performance of the secondary battery.

The plate resistance of the negative electrode plate has a well-known meaning in the art and can be measured using a method known in the art. For example, a multi-functional plate resistance tester (BER1300) is used to carry out the measurement. Firstly, cut the negative electrode plate into a sample with a certain size (a small wafer with a diameter of 40 mm); and then place the sample between two probes to record the testing result. Several different groups (for example, 5 groups) of samples can be taken simultaneously so as to ensure the accuracy of the testing result, and the average value of the testing results of the several different groups of samples is calculated to regard as the testing result.

In the present application, the thickness of the negative electrode film may be measured by a $\frac{1}{10}$ micrometer. For example, a $\frac{1}{10}$ micrometer with a model number of Mitutoyo 293-100 and a precision of 0.1 µm, is used to carry out the measurement.

In the present application, the thickness of the first negative electrode film and the thickness of the second negative electrode film can be measured using a scanning electron microscope (for example, sigma 300). The sample is prepared as follows: firstly, cut the negative electrode plate into a sample with a certain size (for example, 2 cm×2 cm), and fix the negative electrode plate onto a sample table by using paraffin; place and fix the sample table onto a sample holder; open the power supply of an argon cross-section polisher (for example, IB-19500CP), conduct a vacuuming operation (for example, vacuum to $10^{-4}$ Pa), set argon flow (for example, 0.15 MPa), voltage (for example, 8 KV) and polish time (for example, 2 hours), and then adjust the sample table to start polishing in a swing mode. The measurement of the sample may refer to JY/T 010-1996. To ensure the accuracy of the testing results, several different measuring areas (for example, 10) on the sample can be randomly selected to carry out the scanning measurement, the thickness of the first negative electrode film and the thickness of the second negative electrode film in the measuring area can be obtained by reading the value of the ruler and at a certain magnification (for example, a magnification of×500), and the average value of the testing results obtained from the several different measuring areas is regarded as the thickness of the first negative electrode film and the thickness of the second negative electrode film.

In the present application, the areal density of the negative electrode film has a well-known meaning in the art and can be measured using a method known in the art. For example, cut the single-coated and cold-pressed negative electrode plate into a small wafer with an area of S1 (if the negative electrode plate is double-coated, the negative electrode film on one of the surfaces thereof can be wiped off), weigh and record the weight as M1; then wipe off the negative electrode film from the weighed negative electrode plate to obtain the negative electrode current collector, weigh and record the weight of the negative electrode current collector as M0; and the areal density of the negative electrode film=(the weight of the negative electrode plate M1−the weight of the negative electrode current collector M0)/S1. To ensure the accuracy of the testing results, several different groups (for example, 10 groups) of samples can be measured, and the average value thereof is calculated as the testing result.

The pressed density of the negative electrode film has a well-known meaning in the art and can be measured using a method known in the art. For example, the areal density and the thickness of the negative electrode film can be obtained according to the aforementioned methods, and the pressed density of the negative electrode film=the areal density of the negative electrode film/the thickness of the negative electrode film.

In the present application, the first negative electrode film and/or the second negative electrode film generally comprise a negative electrode active material as well as an optional binder, an optional conductive agent and other optional additives.

As an example, the conductive agent may comprise one or more of superconducting carbon, acetylene black, carbon black, Ketjen black, carbon dots, carbon nanotubes, graphene, and carbon nanofibers.

As an example, the binder may comprise one or more of styrene-butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA), and polyvinyl butyral (PVB).

As an example, other optional additives may comprise a thickening and dispersing agent (for example, sodium carboxymethyl cellulose, CMC-Na), a PTC thermistor material and the like.

In the present application, in addition to the aforementioned graphite, the first negative electrode active material and/or the second negative electrode active material of the present application may optionally comprise a certain amount of other conventionally used negative electrode active material, such as one or more of soft carbon, hard carbon, silicon-based material, tin-based material, and lithium titanate. The silicon-based material may be selected from one or more of elemental silicon, silicon oxide, silicon carbon composite, and silicon alloy. The tin-based material may be selected from one or more of elemental tin, tin oxide compound, and tin alloy. These materials are commercially available. A person of ordinary skill in the art can make appropriate select according to actual application environment.

In the secondary battery of the present application, the negative electrode current collector may be a conventional metal foil or a composite current collector (for example, a metal material may be disposed on a polymer substrate to form the composite current collector). As an example, the negative electrode current collector may be a copper foil.

It should be understood that, the negative electrode current collector has two opposite surfaces on its thickness direction, and the negative electrode film may be disposed on either or both of the two opposite surfaces of the negative electrode current collector.

Figure 2:
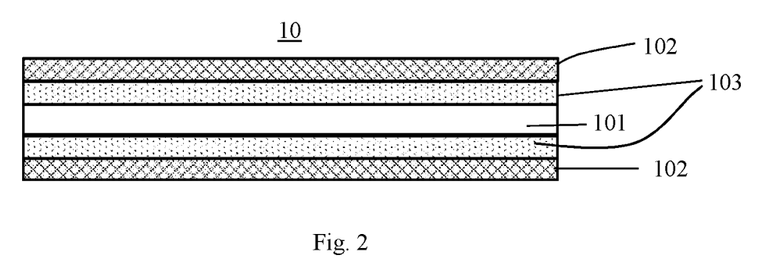
FIG. 2 is a schematic diagram of a negative electrode plate of a secondary battery provided by an embodiment of the present application.

FIG. 2 is a schematic diagram of a negative electrode plate 10 provided by an embodiment of the present application. The negative electrode plate 10 is composed of a negative electrode current collector 101, two first negative electrode films 103 respectively disposed on both surfaces of the negative electrode current collector, and two second negative electrode films 102 respectively disposed on the two first negative electrode films 103.

Figure 3:
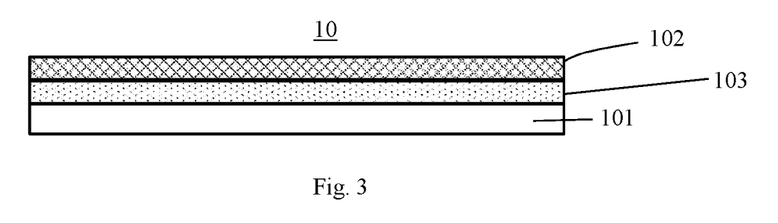
FIG. 3 is a schematic diagram of a negative electrode plate of a secondary battery provided by another embodiment of the present application.

FIG. 3 is a schematic diagram of a negative electrode plate 10 provided by another embodiment of the present application. The negative electrode plate 10 is composed of a negative electrode current collector 101, a first negative electrode film 103 disposed on one of the two opposite surfaces of the negative electrode current collector, and a second negative electrode film 102 disposed on the first negative electrode film 103.

It should be noted that, the given parameters of the negative electrode film (for example, thickness, areal density, etc.) in the present application all refer to the parameters of negative electrode film on one surface. When the negative electrode film is disposed on both surfaces of the negative electrode current collector, as long as the parameters of the negative electrode film disposed on either surface of the negative electrode current collector satisfies the present application, which is considered to fall within the protection scope of the present application. The ranges of the thickness, the areal density and the like in the present application all refer to the parameters of the negative electrode film which is already cold-pressed and used to assemble a battery.

[Positive Electrode Plate]

In the secondary battery of the present application, the positive electrode plate comprises a positive electrode current collector and a positive electrode film disposed on at least one surface of the positive electrode current collector, and the positive electrode film comprises a positive electrode active material.

It should be understood that, the positive electrode current collector has two opposite surfaces on its thickness direction, and the positive electrode film may be laminated and disposed on either or both of the two opposite surfaces of the positive electrode current collector.

In the secondary battery of the present application, the positive electrode current collector may be a conventional metal foil or a composite current collector (for example, a metal material may be disposed on a polymer substrate to form a composite current collector). As an example, the positive electrode current collector may be an aluminum foil.

In the secondary battery of the present application, the positive electrode active material may comprise one or more of lithium transition metal oxides, lithium-containing phosphates with olivine structure and respective modified compounds thereof. Examples of lithium transition metal oxides may include, but be not limited to, one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and respective modified compounds thereof. Examples of lithium-containing phosphates with olivine structure may include, but not be limited to, one or more of lithium ferrous phosphate, composite material of lithium ferrous phosphate and carbon, lithium manganese phosphate, composite material of lithium manganese phosphate and carbon, lithium ferrous manganese phosphate, composite material of lithium ferrous manganese phosphate with carbon and respective modified compounds thereof. The present application is not limited to these materials, and other conventionally known materials that can be used as a positive electrode active material of the secondary battery may also be used.

In some preferred embodiments, the positive electrode active material may comprise one or more of lithium transition metal oxides as shown in Formula 1 and modified compounds thereof so as to further increase the energy density of the battery.

$$Li_aNi_bCo_cM_dO_eA_f \quad \text{Formula 1}$$

In Formula 1, 0.8≤a≤1.2, 0.5≤b≤1, 0c1, 0≤d<1, 1≤e≤2, 0≤f≤1. M is selected from one or more of Mn, Al, Zr, Zn, Cu, Cr, Mg, Fe, V, Ti and B, and A is selected from one or more of N, F, S and Cl.

In the present application, the modified compounds of the aforementioned materials may be doping-modified and/or coating-modified materials.

In the secondary battery of the present application, the positive electrode film also optionally comprises a binder and/or a conductive agent.

As an example, the binder for the positive electrode film may comprise one or more of polyvinylidene fluoride (PVDF) and polytetrafluoroethylene (PTFE).

As an example, the conductive agent for the positive electrode film may comprise one or more of superconducting carbon, acetylene black, carbon black, Ketjen black, carbon dots, carbon nanotubes, graphene, and carbon nanofibers.

[Electrolyte]

The electrolyte conducts ions between the positive electrode plate and the negative electrode plate. There is no specific limitation on the type of the electrolyte in the present application, and it can be selected according to actual needs. For example, the electrolyte may be selected from at least one of a solid electrolyte and a liquid electrolyte (i.e., an electrolytic solution).

In some embodiments, an electrolytic solution is used as the electrolyte. The electrolytic solution comprises an electrolyte salt and a solvent.

In some embodiments, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additive may comprise a negative electrode film-forming additive, a positive electrode film-forming additive, and additives capable of improving certain performance of the battery, such as an additive that improves overcharge performance of the battery, an additive that improves high-temperature performance of the battery, and an additive that improves low-temperature performance of the battery.

[Separator]

In the secondary batteries that use the electrolytic solution and some of the secondary batteries that use the solid electrolyte, a separator is also included. The separator is disposed between the positive electrode plate and the negative electrode plate to play a role of isolation. There is no specific limitation on the type of the separator, and any well-known porous separator having good electrochemical and mechanical stability can be selected. In some embodiments, the material of the separator may be selected from one or more of glass fiber, non-woven fabric, polyethylene, polypropylene, and polyvinylidene fluoride. The separator may be a single-layer film or a multilayer composite film.

When the separator is a multilayer composite film, the materials of each layer may be the same or different.

In some embodiments, the positive electrode plate, the negative electrode plate and the separator may be wound or laminated to form an electrode assembly.

In some embodiments, the secondary battery may comprise an outer package. The outer package may be used to encapsulate the electrode assembly and the electrolyte.

In some embodiments, the outer package of the secondary battery may be a hard case, such as a hard plastic case, an aluminum case and a steel case. The outer package of the secondary battery may also be a soft bag, such as a bag-type soft bag. The soft bag may be made from plastic, such as polypropylene (PP), polybutylene terephthalate (PBT), polybutylene succinate (PBS) or combination thereof.

Figure 1:
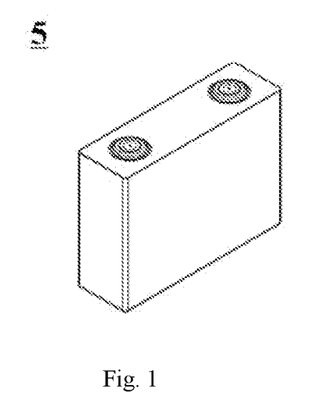
FIG. 1 is a schematic diagram of a secondary battery provided by an embodiment of the present application.

There is no specific limitation on the shape of the secondary battery in the present application, which may be cylindrical, square or any other suitable shape. For example, FIG. 1 is a secondary battery 5 in the shape of a square as an example.

Figure 4:
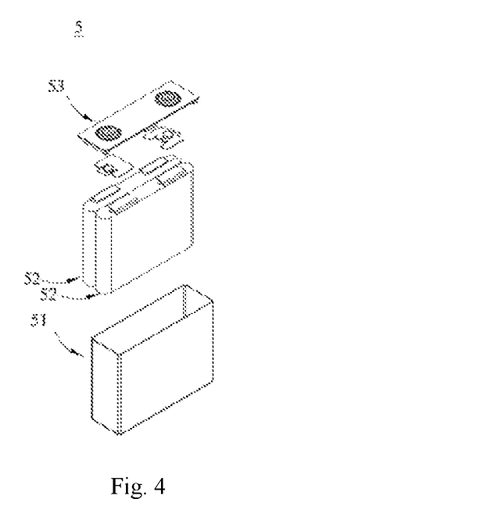
FIG. 4 is an exploded view of a secondary battery provided by an embodiment of the present application.

In some embodiments, referring to FIG. 4, the outer package may comprise a case 51 and a cover plate 53. The case 51 may comprise a bottom plate and a side plate connecting to the bottom plate, the bottom plate and the side plate are enclosed to form a accommodating cavity. The case 51 has an opening communicating with the accommodating cavity, and the cover plate 53 may cover the opening so as to close the accommodating cavity. The positive electrode plate, the negative electrode plate and the separator may be wound or laminated to form an electrode assembly 52. The electrode assembly 52 is encapsulated in the accommodating cavity. The electrolyte solution infiltrates the electrode assembly 52. The number of the electrode assemblies 52 included in the secondary battery 5 may be one or more, and may be adjusted according to different needs.

In some embodiments, the secondary battery can be further assembled into a battery module, a plurality of secondary batteries can be included in the battery module, and the specific number of the secondary batteries can be adjusted according to the application and desirable capacity of the battery module.

Figure 5:
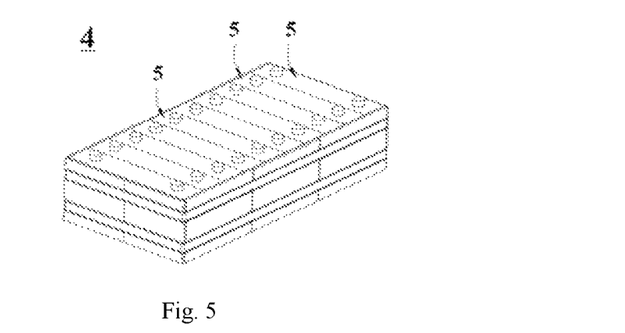
FIG. 5 is a schematic diagram of an embodiment of a battery module.

FIG. 5 is a battery module 4 as an example. Referring to FIG. 5, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed using fasteners.

Optionally, the battery module 4 may comprise a housing with a receiving space, and the plurality of secondary batteries 5 are received in the receiving space.

In some embodiments, the above-mentioned battery module may further be assembled into a battery pack, and the number of the battery modules included in the battery pack can be adjusted according to the application and desirable capacity of the battery pack.

Figure 6:
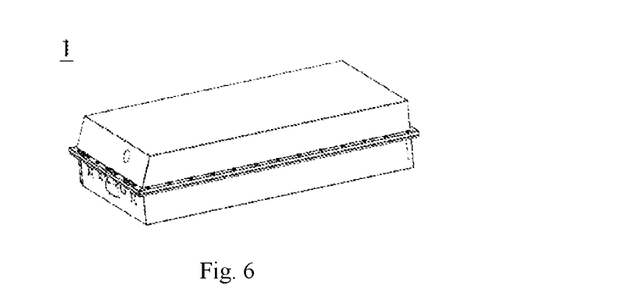
FIG. 6 is a schematic diagram of an embodiment of a battery pack.
Figure 7:
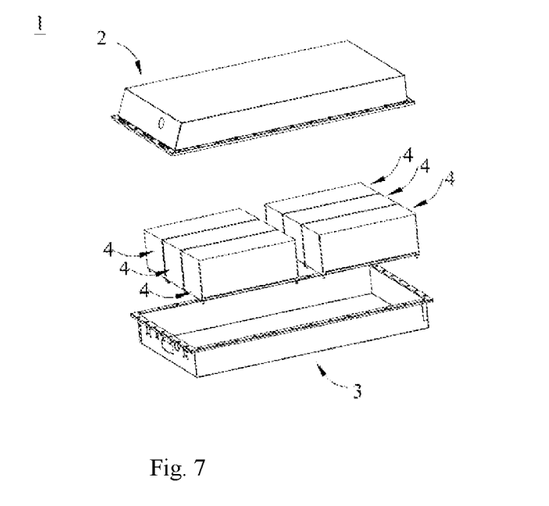
FIG. 7 is an exploded view of FIG. 6.

FIGS. 6 and 7 are a battery pack 1 as an example. Referring to FIGS. 6 and 7, the battery pack 1 may comprise a battery case and a plurality of battery modules 4 disposed in the battery case. The battery case comprises an upper case body 2 and a lower case body 3, the upper case body 2 can cover the lower case body 3 to form a closed space for receiving the plurality of battery modules 4. The plurality of battery modules 4 can be disposed in the battery case in any manner.

Method for Manufacturing Secondary Battery

In a second aspect of the present application, there is provided a method for manufacturing a secondary battery, which comprises the following steps to prepare the negative electrode plate of the secondary battery:

1) forming, on at least one surface of the negative electrode current collector, a first negative electrode film that comprises a first negative electrode active material, wherein the first negative electrode active material comprises natural graphite and satisfies: 6 mΩ·cm≤A≤12 mΩ·cm, and A is a powder resistivity of the first negative electrode active material tested at a pressure of 8 Mpa;

2) forming, on the first negative electrode film, a second negative electrode film that comprises a second negative electrode active material, wherein the second negative electrode active material comprises artificial graphite and satisfies: 13 mΩ·cm≤B≤20 mΩ.cm, and B is a powder resistivity of the second negative electrode active material tested at a pressure of 8 Mpa.

During the preparation process of the secondary battery, controlling and adjusting the composition of the first negative electrode active material, the composition of the second negative electrode active material and the respective powder resistivities thereof in the negative electrode plate can enable the active sites in the negative electrode film to be maintained within a reasonable range, which is beneficial to improving the kinetic performance of the battery; meanwhile, a gradient pore distribution can be formed due to the specific design of the materials respectively in the upper film and the lower film, which can effectively improve the electrolyte infiltration performance and the liquid-phase conduction performance of the active ions so as to improve the cycle life of battery.

In the preparation method of the secondary battery of the present application, the slurry of the first negative electrode active material and the slurry of the second negative electrode active material may be coated simultaneously, and may also be coated in order.

In some preferred embodiments, the slurry of the first negative electrode active material and the slurry of the second negative electrode active material are coated simultaneously. One-time simultaneous coating can make the bonding property between the upper negative electrode film and the lower negative electrode film better, and help to further improve the cycle performance of the battery.

In addition to the preparation method of the negative electrode plate, the construction and preparation method of the secondary battery of the present application are well-known in the art.

As an example, the construction and preparation method of the secondary battery of the present application may be as follows.

Firstly, the positive electrode plate of the battery is prepared according to a conventional method known in the art. The positive electrode active material used for the positive electrode plate is not limited in the present application. Usually, a conductive agent (for example, carbon materials, like carbon black), a binder (for example, PVDF) and the like are necessary to add into the above mentioned positive electrode active material. If needed, other additives, such as PTC thermistor material and the like may also be added. These materials are usually mixed and dispersed in a solvent (for example, NMP), and then uniformly coated on a positive electrode current collector after uniformly stirring, which is then followed by drying and cold pressing, and the positive electrode plate is obtained. As the positive electrode current collector, a material for example a metal foil, such as an aluminum foil, or a porous metal plate can be used.

Usually, in the preparation process of the positive electrode plate, the positive electrode film is not disposed on part of the positive electrode current collector, leaving part of the positive electrode current collector as a positive lead position. Of course, the lead position may also be added to the positive electrode current collector later.

Then the negative electrode plate of the present application is prepared as described above (as the negative electrode plate).

Finally, the positive electrode plate, the separator and the negative electrode plate are stacked in order, so that the separator is positioned between the positive electrode plate and the negative electrode plate to play a role of isolation, and then the positive electrode plate, the separator and the negative electrode plate are wound (or laminated) to obtain an electrode assembly; the electrode assembly is put into an outer package and dried, then the electrolyte solution is injected, after vacuum encapsulation, standing, formation, shaping and the like, a secondary battery is obtained.

Apparatus

In a third aspect of the present application, there is provided an apparatus. The apparatus comprises the secondary battery according to the first aspect of the present application or the secondary battery that is manufactured by the method according to the second aspect of the present application. The secondary battery can be used as a power supply of the apparatus or as an energy storage unit of the apparatus. The apparatus of the present application uses the secondary battery provided in the present application and thus has at least the same advantages as the aforementioned secondary battery.

The apparatus may be, but is not limited to, a mobile device (e.g., a mobile phone, a laptop computer), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack, depending on its practical requirements.

Figure 8:
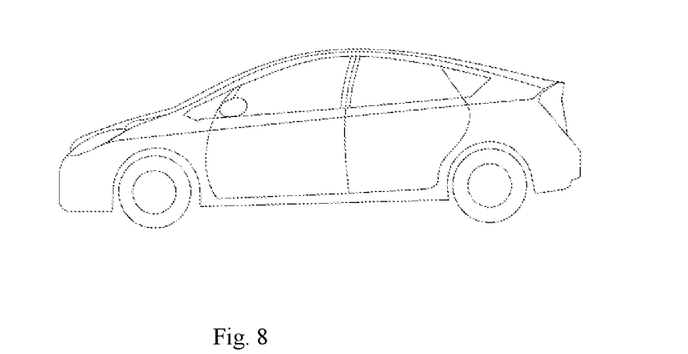
FIG. 8 is a schematic diagram of an apparatus where a secondary battery provided by an embodiment of the present application is used as a power supply.

FIG. 8 is an apparatus as an example. The apparatus is a pure electric vehicle, a hybrid electric vehicle, or a plug-in hybrid electric vehicle. In order to meet the requirements of the apparatus for high power and high energy density of the secondary batteries, the battery pack or the battery module can be used.

As another example, the apparatus may be a mobile phone, a tablet computer, a laptop, etc. The apparatus is generally required to be thin and light, and the secondary battery can be used as a power supply.

The beneficial effects of the present application are further described with reference to the examples below.

EXAMPLE

In order to make the objects, the technical solutions and the beneficial technical effects of the present application more clear, the present application will be further described in details with reference to the examples below. However, it should be understood that the examples of the present application are only intended to explain the present application and are not intended to limit the present application, and the examples of the present application are not limited to the examples set forth herein. The experimental conditions or operating conditions not specified in the examples are prepared according to conventional conditions, or the conditions recommended by the material supplier.

I. Preparation of Secondary Battery

Example 1

1) Preparation of Positive Electrode Plate $LiNi_{0.8}Co_{0.1}Mn_{0.1}O_2$ (NCM811), conductive carbon black (Super-P) and polyvinylidene fluoride (PVDF) as a binder at a mass ratio of 94:3:3 were sufficiently stirred and mixed in N-methyl pyrrolidone as a solvent to obtain a uniform slurry, the slurry was coated on aluminum foil, which was then followed by drying, cold pressing, slitting and cutting, then a positive electrode plate was obtained. An areal density of the positive electrode film was 17.5 mg/cm$^2$ and a pressed density of the positive electrode film was 3.4 g/cm$^3$.

2) Preparation of Negative Electrode Plate

Firstly, preparation of negative slurry 1: natural graphite as a first negative electrode active material, SBR as a binder, carboxymethyl cellulose sodium (CMC—Na) as a thickener and conductive carbon black (Super P) were weighed at a mass ratio of 96.2:1.8:1.2:0.8, which was then added into a stirring tank together with deionized water in a certain order to obtain a negative electrode slurry 1. A powder resistivity of natural graphite tested at a pressure of 8 Mpa was 6.1 mΩ·cm.

Secondly, preparation of negative slurry 2: artificial graphite as a second negative electrode active material, SBR as a binder, carboxymethyl cellulose sodium (CMC—Na) as a thickener and conductive carbon black (Super P) were weighed at a mass ratio of 96.2:1.8:1.2:0.8, which was then added into a stirring tank together with deionized water in a certain order to obtain a negative electrode slurry 2. A powder resistivity of artificial graphite tested at a pressure of 8 Mpa was 16.1 mΩ·cm.

Thirdly, the negative electrode slurry 1 and the negative electrode slurry 2 were extruded simultaneously through a double-cavity coating apparatus. The negative electrode slurry 1 was coated on the negative electrode current collector to form a first negative electrode film, and the negative electrode slurry 2 was coated on the first negative electrode film to form a second negative electrode film; a mass ratio of the first negative electrode film to the second negative electrode film was 1:1; an areal density of the negative electrode film was 11.5 mg/cm$^2$; and a pressed density of the negative electrode film was 1.65 g/cm$^3$.

The fourth, the above-prepared wet film was baked under different temperature zones through an oven to obtain a dried electrode plate, then the dried electrode plate was cold pressed to obtain the needed negative electrode film, which was then followed by slitting and cutting, finally a negative electrode plate was obtained.

3) Separator

PE film was used as the separator.

4) Preparation of Electrolyte Solution

Ethylene carbonate (EC), methyl ethyl carbonate (EMC) and diethyl carbonate (DEC) were mixed at a volume ratio of 1:1:1, and then sufficiently dried LiPF$_6$ as a lithium salt was dissolved in the thus-obtained organic solvent to obtain the electrolyte solution, in which the concentration of LiPF$_6$ was 1 mol/L.

5) Preparation of Battery

The positive electrode plate, the separator and the negative electrode plate were stacked in order and then wound to obtain an electrode assembly, the electrode assembly was put into the outer package, then the above-described electrolyte solution was injected, and after encapsulation, standing, formation and aging, a secondary battery was obtained.

The preparation methods of the secondary batteries in Examples 2-22 (Ex. 2-22) and Comparative Examples 1-4 (CE. 1-4) were similar to those of Example 1, but the compositions and the product parameters of the electrode plate of the battery were adjusted, and the different product parameters were shown in Table 1 and Table 2 in details.

II. Testing Method of Performance Parameter

Testing methods of the parameters of the negative electrode active material and testing methods of the parameters of the structure of the battery were described in the specification of the present application. The testing methods of the performances of the secondary battery were as follows.

1) Testing of kinetic performance of battery (lithium precipitation performance at room temperature)

At 25° C., the charging and discharging process of the battery of each of the examples and comparative examples was carried out as follows. The battery was discharged at a constant current of 1.0 C (which equaled to the value of the current where the theoretical capacity was fully discharged within 1 hour) to 2.8 V (discharging cut-off voltage). Then the battery was charged at a constant current of 1.0 C to 4.2 V (charging cut-off voltage), and then charged at a constant voltage to 0.05 C; at this time the battery was fully charged. The fully charged battery was kept standing for 5 minutes, then discharged at a constant current of 1.0 C to the discharging cut-off voltage, and the discharge capacity at this time was the actual capacity at 1.0 C of the battery, which was recorded as C0. After that, the battery was charged at a constant current of x C0 to the upper limit of the cut-off voltage, and then charged at a constant voltage to 0.05 C0 and kept standing for 5 minutes; afterwards the battery was disassembled to observe the lithium precipitation at the interface. If there was no lithium precipitation on the surface of the negative electrode plate, the charging rate was increased and the testing process was repeated, until there was lithium precipitation on the surface of the negative electrode plate. The maximum charging rate of the battery when there was no lithium precipitation on the surface of the negative electrode plate was recorded to characterize the kinetic performance of the battery.

2) Testing of High-Temperature Cycle Performance of Battery

At 60° C., a first charging and discharging process was carried out: the battery was charged at a constant current of 1.0 C (which equaled to the value of the current where the theoretical capacity was fully discharged within 1 hour) and then charged at a constant voltage until the charging cut-off voltage reached 4.2V; afterwards the battery was discharge at a constant current of 1.0 C to 2.8 V (discharging cut-off voltage). The above was a charging and discharging cycle, and the discharge capacity at this time was regarded as the discharge capacity of the first cycle. Then, the charging and discharging cycle was repeated, the discharge capacity of each cycle was recorded, and the capacity retention rate of each cycle was calculated according to the formula: the capacity retention rate of $N^{th}$ cycle=(the discharge capacity of $N^{th}$ cycle/the discharge capacity of the first cycle)×100%. Record the number of cycles of the battery until the capacity retention rate was attenuated to 80%.

III. Testing Results of Examples and Comparative Examples

The battery of each of the examples and comparative examples was prepared, the performance parameters thereof were then measured according to the above-mentioned methods, and the testing results were shown in Table 1 and Table 2.

Firstly, it could be seen from the data of Examples 1-10 and Comparative Examples 1-4 shown in Table 1, only when the natural graphite in the first negative electrode active material satisfied 6 mΩ·cm≤A≤12 mΩ·cm and the artificial graphite in the second negative electrode active material satisfied 13 mΩ·cm≤B≤20 mΩ·cm, the secondary batteries could have both high cycle performance and excellent fast-charging performance (kinetic performance). When the natural graphite in the first negative electrode active material satisfied 8 mΩ·cm≤A≤11 mΩ·cm and the artificial graphite in the second negative electrode active material satisfied 14 mΩ·cm≤B≤18 mΩ·cm, the comprehensive performance of the secondary battery could be optimal. In particular, when a ratio of B to A satisfied 1.5≤B/A≤2.0, the performance of the secondary battery could be even better.

In addition, it could be seen from the comparison of Examples 11-18 and Examples 19-22 shown in Table 2, the particle size distribution (Dv90-Dv10)/Dv50 of the negative electrode active material also had a greater influence on the performance of the battery. Under the premise that the natural graphite in the first negative electrode active material satisfied 6 mΩ·cm≤A≤12 mΩ·cm and the artificial graphite in the second negative electrode active material satisfied 13 mΩ·cm≤B≤20 mΩ·cm, the first negative electrode active material had a particle size distribution (Dv90-Dv10)/Dv50 of less than the second negative electrode active material, otherwise, the cycle performance and the kinetic performance of the secondary battery was relatively poor (referring to Examples 20 and 21). It could be seen from the data shown in Table 2, when the first negative electrode active material had a particle size distribution of 1.0≤(Dv90-Dv10)/Dv50≤1.5, and preferably 1.0≤(Dv90-Dv10)/Dv50≤1.3; and/or, the second negative electrode active material had a particle size distribution of 1.0≤(Dv90-Dv10)/Dv50≤2, and preferably 1.2≤(Dv90-Dv10)/Dv50≤1.7, the comprehensive performance of the secondary battery could be better.

As known from the data shown in Table 1 and Table 2, in order to make the secondary battery have good kinetic performance and longer cycle life while maintaining higher energy density, the secondary battery should satisfy that the natural graphite in the first negative electrode active material satisfied 6 mΩ·cm≤A≤12 mΩ·cm and the artificial graphite in the second negative electrode active material satisfied 13 mΩ·cm≤B≤20 mΩ·cm.

Some exemplary embodiments of the present application are provided as follows.

Embodiment 1

A secondary battery, comprising a negative electrode plate that comprises a negative electrode current collector and a negative electrode film, the negative electrode film comprising a first negative electrode film and a second negative electrode film, the first negative electrode film being disposed on at least one surface of the negative electrode current collector and comprising a first negative electrode active material, and the second negative electrode film being disposed on the first negative electrode film and comprising a second negative electrode active material; wherein the first negative electrode active material comprises natural graphite and satisfies: 6 mΩ·cm≤A≤12 mΩ·cm, the second negative electrode active material comprises artificial graphite and satisfies: 13 mΩ·cm≤B≤20 mΩ·cm, A is a powder resistivity of the first negative electrode active material tested at a pressure of 8 Mpa, and B is a powder resistivity of the second negative electrode active material tested at a pressure of 8 Mpa.

Embodiment 2

The secondary battery according to Embodiment 1, wherein 8 mΩ·cm≤A≤11 mΩ·cm; and/or, 14 mΩ·cm≤B≤18 mΩ·cm.

Embodiment 3

The secondary battery according to any one of Embodiments 1-2, wherein 1.4≤B/A≤3; preferably, 1.5≤B/A≤2.0.

Embodiment 4

The secondary battery according to any one of Embodiments 1-3, wherein the natural graphite constitutes ≥50% by mass of the first negative electrode active material, preferably from 80% to 100% by mass; and/or, the artificial graphite constitutes ≥80% by mass of the second negative electrode active material, preferably from 90% to 100% by mass.

Embodiment 5

The secondary battery according to any one of Embodiments 1-4, wherein the first negative electrode active material has a particle size distribution (Dv90-Dv10)/ Dv50 of less than the second negative electrode active material.

Embodiment 6

The secondary battery according to any one of Embodiments 1-5, wherein the first negative electrode active material has a particle size distribution of 1.0≤(Dv90-Dv10)/Dv50≤1.5, preferably 1.0≤(Dv90-Dv10)/Dv50≤1.3; and/or, the second negative electrode active material has a particle size distribution of 1.0≤(Dv90-Dv10)/Dv50≤2, preferably 1.2≤(Dv90-Dv10)/Dv50≤1.7.

Embodiment 7

The secondary battery according to any one of Embodiments 1-6, wherein the first negative electrode active material has a volume average particle size Dv50 of greater than the second negative electrode active material.

Embodiment 8

The secondary battery according to any one of Embodiments 1-7, wherein the first negative electrode active material has a volume average particle size Dv50 of from 15 μm to 19 μm, preferably from 16 μm to 18 μm; and/or, the second negative electrode active material has a volume average particle size Dv50 of from 14 μm to 18μm, preferably from 15 μm to 17 μm.

Embodiment 9

The secondary battery according to any one of Embodiments 1-8, wherein the first negative electrode active material further satisfies one or more of the following (1)-(4):

(1) the first negative electrode active material has a powder compaction density of from 1.85 g/cm³ to 2.1 g/cm³ under an action force of 50,000 N, preferably from 1.9 g/cm³ to 2.0 g/cm³;

(2) the first negative electrode active material has a graphitization degree of from 95% to 98%, preferably from 96% to 97%;

(3) the first negative electrode active material is in a shape of one or more of sphere and spheroid; and (4) an amorphous carbon coating layer is presented on at least part of surface of the first negative electrode active material.

Embodiment 10

The secondary battery according to any one of Embodiments 1-9, wherein the second negative electrode active material further satisfies one or more of the following (1)-(4):

(1) the second negative electrode active material has a powder compaction density of from 1.7 g/cm³ to 1.9 g/cm³ under an action force of 50,000 N, preferably from 1.8 g/cm³ to 1.9 g/cm³;

(2) the second negative electrode active material has a graphitization degree of from 90% to 95%, preferably from 91% to 93%;

(3) the second negative electrode active material is in a shape of one or more of block and flake; and (4) no amorphous carbon coating layer is presented on surface of the second negative electrode active material.

Embodiment 11

The secondary battery according to any one of Embodiments 1-10, wherein the secondary battery further satisfies one or more of the following (1)-(3):

(1) the negative electrode film has a thickness of ≥50 μm, preferably from 60 μm tocl 75 μm;

(2) the negative electrode film has a areal density of from 9 mg/cm² to 14 mg/cm², preferably from 11 mg/cm² to 13 mg/cm²; and (3) a thickness ratio of the first negative electrode film to the second negative electrode film is from 1:1.01 to 1:1.1, preferably from 1:1.02 to 1:1.06.

Embodiment 12

The secondary battery according to any one of Embodiments 1-11, wherein under the conditions that two circular areas with the same area are arbitrarily selected on the negative electrode film and respectively marked as a first area and a second area as well as a distance between centers of the first area and the second area is 20 cm, a difference between plate resistance R11 of the first area and plate resistance R12 of the second area satisfies: |R11-R12|≤3 mΩ·cm, preferably |R11-R12|≤1 mΩ·cm.

Embodiment 13

The secondary battery according to any one of Embodiments 1-12, wherein the secondary battery comprises a positive electrode plate; the positive electrode plate comprises a positive electrode current collector and a positive electrode film, the positive electrode film is disposed on at least one surface of the positive electrode current collector and comprises a positive electrode active material, and the positive electrode active material comprises one or more of lithium transition metal oxides, lithium-containing phosphates with olivine structure and respective modified compounds thereof; preferably, the positive electrode active material comprises one or more of lithium transition metal oxides as shown in Formula 1 and modified compounds thereof, in the Formula 1, 0.8≤a≤1.2, 0.5≤b≤1, 0≤c≤1, 0≤d≤1, 1≤e≤2, and 0≤f≤1, wherein M is selected from one or more of Mn, Al, Zr, Zn, Cu, Cr, Mg, Fe, V, Ti and B, and A is selected from one or more of N, F, S and Cl.

$$Li_aNi_bCo_cMd O_eA_f \quad \text{Formula 1}$$

Embodiment 14

A method for manufacturing a secondary battery, comprising the following steps to prepare a negative electrode plate of the secondary battery:

1) forming, on at least one surface of the negative electrode current collector, a first negative electrode film that comprises a first negative electrode active material, wherein the first negative electrode active material comprises natural graphite and satisfies: 6 mΩ·cm≤A≤12 mΩ·cm; and 2) forming, on the first negative electrode film, a second negative electrode film that comprises a second negative electrode active material, wherein the second negative electrode active material comprises artificial graphite and satisfies: 13 mΩ·cm≤B≤20 mΩ·cm, wherein A is a powder resistivity of the first negative electrode active material tested at a pressure of 8 Mpa, and B is a powder resistivity of the second negative electrode active material tested at a pressure of 8 Mpa.

Embodiment 15

An apparatus, comprising the secondary battery according to any one of Embodiments 1-13 or the secondary battery that is manufactured by the method according to Embodiment 14.

It is also to be understood that the above-described embodiments may be appropriately modified and varied by those skilled in the art in light of the above disclosure. Therefore, the present application is not limited to the specific embodiments as disclosed and described above, and the modifications and variations of the present application are intended to fall within the scope of the appended claims. In addition, although some specifically defined terms are used in the specification, these terms are merely used for convenience of description and do not impose any limitation on the present application.

TABLE 1

| No. | First negative electrode active material | Powder resistivity A of first negative electrode active material (mΩ · cm) | Second negative electrode active material | Powder resistivity B of second negative electrode active material (mΩ · cm) | B/A | Lithium precipitation performance at room temperature | High-temperature cycle performance |
|---|---|---|---|---|---|---|---|
| Ex. 1 | Natural graphite | 6.1 | Artificial graphite | 16.1 | 2.6 | 1.9 C | 1309 |
| Ex. 2 | Natural graphite | 7.8 | Artificial graphite | 16.1 | 2.1 | 2.1 C | 1280 |
| Ex. 3 | Natural graphite | 9.5 | Artificial graphite | 16.1 | 1.7 | 2.3 C | 1125 |
| Ex. 4 | Natural graphite | 10.7 | Artificial graphite | 16.1 | 1.5 | 2.4 C | 1014 |
| Ex. 5 | Natural graphite | 12.0 | Artificial graphite | 16.1 | 1.3 | 2.6 C | 938 |
| Ex. 6 | Natural graphite | 9.5 | Artificial graphite | 13.2 | 1.4 | 1.7 C | 1395 |
| Ex. 7 | Natural graphite | 9.5 | Artificial graphite | 14.7 | 1.5 | 1.9 C | 1310 |
| Ex. 8 | Natural graphite | 9.5 | Artificial graphite | 16.2 | 1.7 | 2.3 C | 1298 |
| Ex. 9 | Natural graphite | 9.5 | Artificial graphite | 17.7 | 1.9 | 2.5 C | 1023 |
| Ex. 10 | Natural graphite | 9.5 | Artificial graphite | 20.0 | 2.1 | 2.7 C | 921 |
| CE. 1 | Natural graphite | 4.5 | Artificial graphite | 16.2 | 3.6 | 0.8 C | 904 |
| CE. 2 | Natural graphite | 17.2 | Artificial graphite | 16.2 | 0.9 | 1.1 C | 842 |
| CE. 3 | Natural graphite | 9.5 | Artificial graphite | 7.2 | 0.8 | 0.5 C | 951 |
| CE. 4 | Natural graphite | 9.5 | Artificial graphite | 25.4 | 2.7 | 1.2 C | 898 |

TABLE 2

| No. | First negative electrode active material | Powder resistivity A of first negative electrode active material (mΩ · cm) | (Dv90 − Dv10)/Dv50 of first negative electrode active material | Dv50 of first negative electrode active material (μm) | Second negative electrode active material | Powder resistivity B of Second negative electrode active material (mΩ · cm) | (Dv90 − Dv10)/Dv50 of Second negative electrode active material | Dv50 of Second negative electrode active material (μm) | Lithium precipitation performance at room temperature | High-temperature cycle performance |
|---|---|---|---|---|---|---|---|---|---|---|
| Ex. 11 | Natural graphite | 9.5 | 1.02 | 17.9 | Artificial graphite | 16.1 | 1.40 | 16.4 | 1.8 C | 1125 |
| Ex. 12 | Natural graphite | 9.5 | 1.12 | 17.8 | Artificial graphite | 16.1 | 1.40 | 16.4 | 2.2 C | 1289 |
| Ex. 13 | Natural graphite | 9.5 | 1.22 | 17.5 | Artificial graphite | 16.1 | 1.40 | 16.4 | 2.5 C | 1327 |
| Ex. 14 | Natural graphite | 9.5 | 1.32 | 17.4 | Artificial graphite | 16.1 | 1.40 | 16.4 | 2.7 C | 1104 |
| Ex. 15 | Natural graphite | 9.5 | 1.10 | 17.5 | Artificial graphite | 16.1 | 1.10 | 16.8 | 1.9 C | 1187 |
| Ex. 16 | Natural graphite | 9.5 | 1.10 | 17.5 | Artificial graphite | 16.1 | 1.30 | 16.6 | 2.1 C | 1238 |
| Ex. 17 | Natural graphite | 9.5 | 1.10 | 17.5 | Artificial graphite | 16.1 | 1.50 | 16.4 | 2.6 C | 1429 |

TABLE 2-continued

| No. | First negative electrode active material | Powder resistivity A of first negative electrode active material (mΩ·cm) | (Dv90 − Dv10)/Dv50 of first negative electrode active material | Dv50 of first negative electrode active material (μm) | Second negative electrode active material | Powder resistivity B of Second negative electrode active material (mΩ·cm) | (Dv90 − Dv10)/Dv50 of Second negative electrode active material | Dv50 of Second negative electrode active material (μm) | Lithium precipitation performance at room temperature | High-temperature cycle performance |
|---|---|---|---|---|---|---|---|---|---|---|
| Ex. 18 | Natural graphite | 9.5 | 1.10 | 17.5 | Artificial graphite | 16.1 | 1.70 | 16.1 | 2.7 C | 1301 |
| Ex. 19 | Natural graphite | 9.5 | 0.96 | 19.0 | Artificial graphite | 16.1 | 1.40 | 16.4 | 1.3 C | 1192 |
| Ex. 20 | Natural graphite | 9.5 | 1.85 | 15.1 | Artificial graphite | 16.1 | 1.40 | 16.4 | 1.6 C | 993 |
| Ex. 21 | Natural graphite | 9.5 | 1.10 | 17.5 | Artificial graphite | 16.1 | 0.95 | 18 | 1.4 C | 1235 |
| Ex. 22 | Natural graphite | 9.5 | 1.10 | 17.5 | Artificial graphite | 16.1 | 2.50 | 14 | 1.7 C | 1002 |

The invention claimed is:

1. A secondary battery, comprising a negative electrode plate that comprises a negative electrode current collector and a negative electrode film, the negative electrode film comprising a first negative electrode film and a second negative electrode film, the first negative electrode film being disposed on at least one surface of the negative electrode current collector and comprising a first negative electrode active material, and the second negative electrode film being disposed on the first negative electrode film and comprising a second negative electrode active material;

wherein the first negative electrode active material comprises natural graphite and satisfies: 6mΩ·cm≤A≤12mΩ·cm, and the first negative electrode active material has a particle size distribution (Dv90-Dv10)/Dv50 of less than that of the second negative electrode active material, the second negative electrode active material comprises artificial graphite and satisfies:

13 mΩ·<B<20mΩ·cm,

A is a powder resistivity of the first negative electrode active material tested at a pressure of 8 Mpa, and B is a powder resistivity of the second negative electrode active material tested at a pressure of 8 Mpa.

2. The secondary battery according to claim 1, wherein 8mΩ·cm≤A≤11mΩ·cm; and/or, 14Ω·cm<B<18mΩ·cm.

3. The secondary battery according to claim 1, wherein 1.4≤B/A ≤.

4. The secondary battery according to claim 1, wherein the natural graphite constitutes >50% by mass of the first negative electrode active material; and/or, the artificial graphite constitutes >80% by mass of the second negative electrode active material.

5. The secondary battery according to claim 1, wherein the first negative electrode active material has a particle size distribution of 1.0≤(Dv90-Dv10)/ Dv50<1.5; and/or, the second negative electrode active material has a particle size distribution of 1.0<(Dv90-Dv10)/Dv50<2.

6. The secondary battery according to claim 1, wherein the first negative electrode active material has a volume average particle size Dv50 of greater than that of the second negative electrode active material.

7. The secondary battery according to claim 6, wherein the first negative electrode active material has a volume average particle size Dv50 of from 15 μm to 19 μm, preferably from 16 μm to 18 μm; and/or, the second negative electrode active material has a volume average particle size Dv50 of from 14 μm to 18 μm, preferably from 15 μm to 17 μm.

8. The secondary battery according to claim 6, wherein the first negative electrode active material has a volume average particle size Dv50 of from 16 μm to 18 μm; and/or, the second negative electrode active material has a volume average particle size Dv50 of from 15 μm to 17 μm.

9. The secondary battery according to claim 1, wherein the first negative electrode active material further satisfies one or more of the following (1)-(4):

(1) the first negative electrode active material has a powder compaction density of from 1.85 g/cm$^3$ to 2.1 g/cm$^3$ under an action force of 50,000 N;

(2) the first negative electrode active material has a graphitization degree of from 95% to 98%;

(3) the first negative electrode active material is in a shape of one or more of sphere and spheroid; and (4) an amorphous carbon coating layer is presented on at least part of surface of the first negative electrode active material.

10. The secondary battery according to claim 1, wherein the second negative electrode active material further satisfies one or more of the following (1)-(4):

(1) the second negative electrode active material has a powder compaction density of from 1.7 g/cm$^3$ to 1.9 g/cm$^3$ under an action force of 50,000 N;

(2) the second negative electrode active material has a graphitization degree of from 90% to 95%;

(3) the second negative electrode active material is in a shape of one or more of block and flake; and (4) no amorphous carbon coating layer is presented on surface of the second negative electrode active material.

11. The secondary battery according to claim 1, wherein the secondary battery further satisfies one or more of the following (1)-(3):

(1) the negative electrode film has a thickness of >50 μm;

(2) the negative electrode film has a areal density of from 9 mg/cm$^2$ to 14 mg/cm$^2$; and (3) a thickness ratio of the first negative electrode film to the second negative electrode film is from 1:1.01 to 1:1.1.

12. The secondary battery according to claim 1, wherein under the conditions that two circular areas with the same area are arbitrarily selected on the negative electrode film and respectively marked as a first area and a second area as well as a distance between centers of the first area and the second area is 20 cm, a difference between plate resistance R11 of the first area and plate resistance R12 of the second area satisfies: |R11-R12|<3mΩ·m.

13. The secondary battery according to claim 1, wherein the secondary battery further comprises a positive electrode plate; the positive electrode plate comprises a positive electrode current collector and a positive electrode film, the positive electrode film is disposed on at least one surface of the positive electrode current collector and comprises a positive electrode active material, and the positive electrode active material comprises one or more of lithium transition metal oxides, lithium-containing phosphates with olivine structure and respective modified compounds thereof.

14. The secondary battery according to claim 1, wherein 1.5<B/A <2.0.

15. The secondary battery according to claim 1, wherein the natural graphite constitutes from 80% to 100% by mass of the first negative electrode active material; and/or, the artificial graphite constitutes from 90% to 100% by mass of the second negative electrode active material.

16. The secondary battery according to claim 1, wherein the first negative electrode active material has a particle size distribution of 1.0<(Dv90-Dv10)/Dv50<1.3; and/or, the second negative electrode active material has a particle size distribution of 1.2<(Dv90-Dv10)/Dv50<1.7.

17. The secondary battery according to claim 1, wherein the first negative electrode active material further satisfies one or more of the following (1)-(4):
   (1) the first negative electrode active material has a powder compaction density of from 1.9 g/cm³ to 2.0 g/cm³ under an action force of 50,000 N;
   (2) the first negative electrode active material has a graphitization degree of from 96% to 97%;
   (3) the first negative electrode active material is in a shape of one or more of sphere and spheroid; and
   (4) an amorphous carbon coating layer is presented on at least part of surface of the first negative electrode active material.

18. An apparatus, comprising the secondary battery according to claim 1.

19. A method for manufacturing a secondary battery, comprising the following steps to prepare a negative electrode plate of the secondary battery:
   1) forming, on at least one surface of the negative electrode current collector, a first negative electrode film that comprises a first negative electrode active material, wherein the first negative electrode active material comprises natural graphite and satisfies: 6 mΩ·m<A<12 mΩ·cm, and the first negative electrode active material has a particle size distribution (Dv90-Dv10)/Dv50 of less than that of the second negative electrode active material; and
   2) forming, on the first negative electrode film, a second negative electrode film that comprises a second negative electrode active material, wherein the second negative electrode active material comprises artificial graphite and satisfies: 13 mΩ·m<B<20 mΩ·cm,
   wherein A is a powder resistivity of the first negative electrode active material tested at a pressure of 8 Mpa, and B is a powder resistivity of the second negative electrode active material tested at a pressure of 8 Mpa,
   3) resulting in the secondary battery of claim 1.

* * * * *